US008320092B2

United States Patent
Fuchigami (10) Patent No.: US 8,320,092 B2
(45) Date of Patent: Nov. 27, 2012

(54) PROTECTION CIRCUIT AND SEMICONDUCTOR DEVICE

(75) Inventor: Chikashi Fuchigami, Kanagawa (JP)

(73) Assignee: Lapis Semiconductor Co., Ltd. (JP)

( * ) Notice: Subject to any disclaimer, the term of this patent is extended or adjusted under 35 U.S.C. 154(b) by 108 days.

(21) Appl. No.: 12/929,604

(22) Filed: Feb. 3, 2011

(65) Prior Publication Data

US 2011/0205679 A1 Aug. 25, 2011

(30) Foreign Application Priority Data

Feb. 19, 2010 (JP) .................................. 2010-035342
Sep. 9, 2010 (JP) .................................. 2010-201957

(51) Int. Cl.
*H02H 3/22* (2006.01)

(52) U.S. Cl. .......................... 361/56; 361/91.1; 361/111

(58) Field of Classification Search ..................... 361/56, 361/91.1, 111
See application file for complete search history.

(56) References Cited

U.S. PATENT DOCUMENTS

| 7,233,467 B2 * | 6/2007 | Mergens et al. | 361/56 |
| 2002/0125931 A1 * | 9/2002 | Yue et al. | 327/310 |

FOREIGN PATENT DOCUMENTS

| JP | 7-007406 A | 1/1995 |
| JP | 2006-121007 A | 5/2006 |

* cited by examiner

*Primary Examiner* — Rexford Barnie
*Assistant Examiner* — Haihui Zhang
(74) *Attorney, Agent, or Firm* — Rabin & Berdo, P.C.

(57) ABSTRACT

A protection circuit 10 provided with a current regulating section 14 with a first end connected to a power source line VDD and a second end connected to an input terminal 116A of an inverter 116. The current regulating section 14 applies a voltage of less than a threshold value voltage to the input terminal 116A when a surge current having predetermined frequency characteristics flows from the first end in a particular flow path, by generating induced electromotive force so as to generate a magnetic field to cancel out the magnetic field occurring due to the surge current, thereby impeding flow of the surge current. The current regulating section 14 applies a voltage of the threshold value voltage or greater to the input terminal 116A when a driving current not having the frequency characteristics flows in from the first end.

10 Claims, 8 Drawing Sheets

PROTECTION CIRCUIT AND
SEMICONDUCTOR DEVICE

CROSS-REFERENCE TO RELATED
APPLICATION

This application claims priority under 35 USC 119 from Japanese Patent Application Nos. 2010-035342 filed on Feb. 19, 2010, and No. 2010-201957 filed on Sep. 9, 2010, the disclosures of which are incorporated by reference herein.

BACKGROUND

1. Technical Field

The present invention relates to a protection circuit and a semiconductor device, and in particular to a protection circuit for protecting an internal circuit from inflowing current due to electro-static discharge, and a semiconductor device provided with such a protection circuit.

2. Related Art

Sometimes violent electrical discharge occurs when a charged electrically conductive body (such as a person) makes contact or gets near to another conductive body (such as an electrical device). This phenomenon is referred to as electro-static discharge (ESD). In semiconductor devices, with the current trend towards higher levels of integration and even finer configuration elements of integrated circuits, preventing damage to internal circuits caused by inflow of external high voltage waveforms from ESD has become an issue.

As a technique for addressing this issue, a technique is known in which a protection circuit is provided to a semiconductor device. The protection circuit protects an internal circuit by responding to high voltage changes in either a power source line for applying a plus electrical potential used for driving to a semiconductor device, or in a ground line for applying a ground electrical potential to a semiconductor device, and eliminating the potential difference between the power source line and the ground line.

Figure 7:
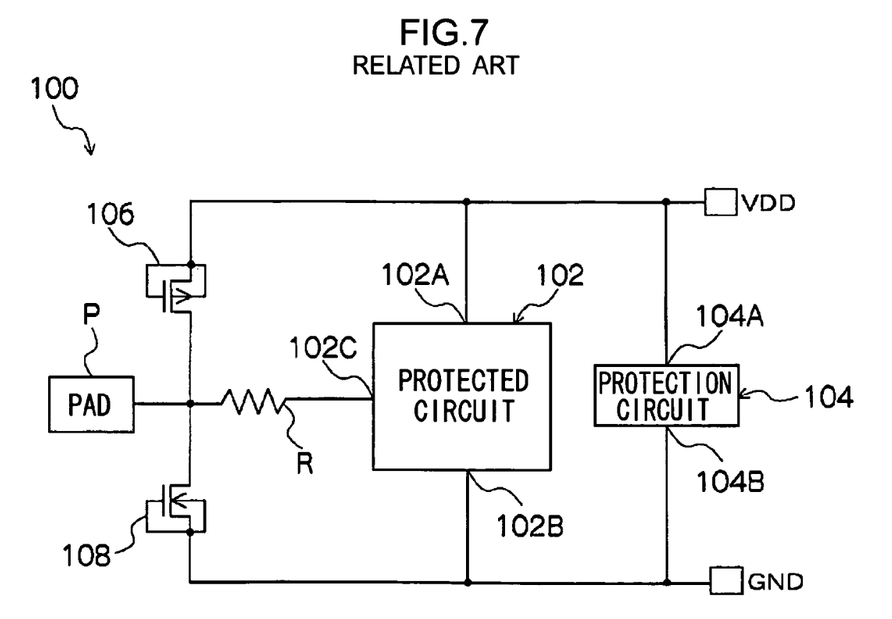
FIG. 7 is a configuration diagram schematically showing a configuration of a semiconductor device installed with a conventional protection circuit.

FIG. 7 schematically shows an example of a protection circuit layout in a semiconductor device. As shown in FIG. 7, a conventional semiconductor device 100 is configured including a protected circuit 102, equivalent to a semiconductor integrated circuit, and a protection circuit 104. The protected circuit 102 is equipped with a first terminal 102A, a second terminal 102B and a control terminal 102C. The first terminal 102A is connected to a power source line VDD, the second terminal 102B is connected to a ground (earth) line GND, and the control terminal 102C is connected through a resistor R to a pad P.

The semiconductor device 100 is equipped with a P-channel MOS transistor (referred to below as "PMOS transistor") 106 and an N-channel MOS transistor (referred to below as "NMOS transistor") 108. The drain terminals of each of the PMOS transistor 106 and the NMOS transistor 108 are connected to a connection point between the resistor R and the pad P. The source terminal, gate terminal and back gate terminal of the PMOS transistor 106 are connected to the power source line VDD, and the source terminal, gate terminal and back gate terminal of the NMOS transistor 108 are connected to the ground line GND.

The protection circuit 104 is equipped with a first terminal 104A and a second terminal 104B.
The first terminal 104A is connected to the power source line VDD and the second terminal 104B is connected to the ground line GND. In the semiconductor device 100 configured as described, when voltage of high voltage waveform occurring due to ESD (referred to below as "surge voltage") is applied to either the power source line VDD or the ground line GND, the protected circuit 102 is protected due to the protection circuit 104 operating with the surge voltage as a trigger, so as to eliminate the potential difference between the power source line VDD and the ground line GND.

Figure 8:
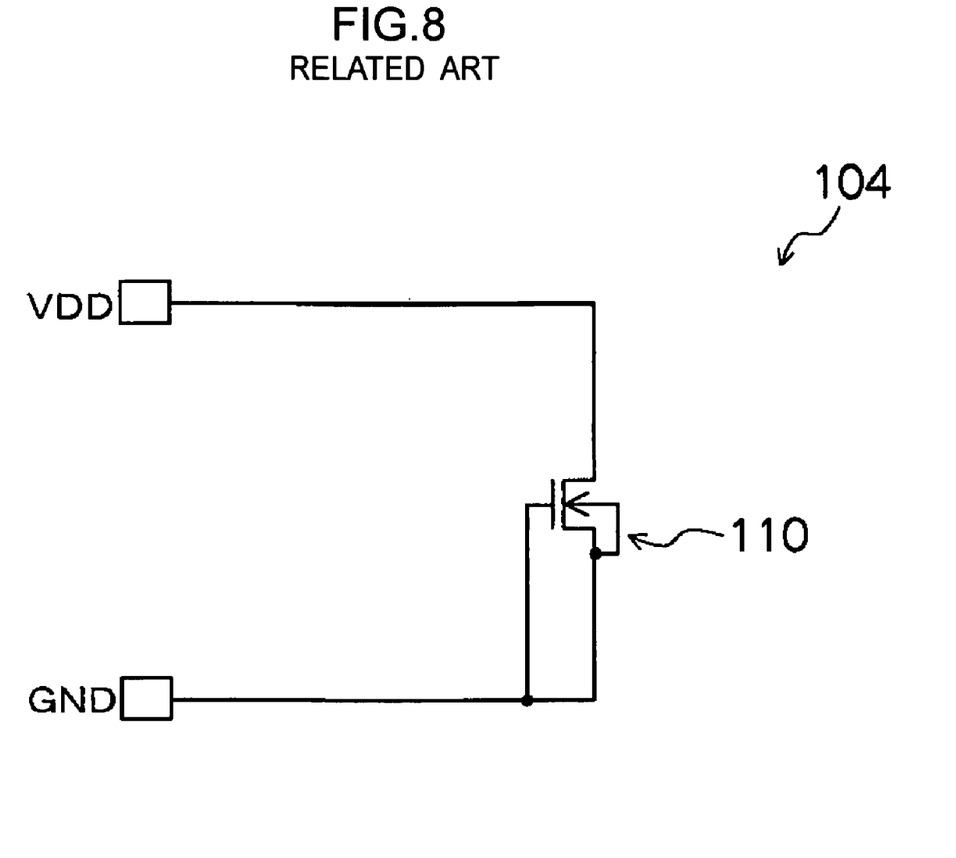
FIG. 8 is a circuit diagram showing an example of a conventional protection circuit.

An example of a protection circuit 104 is schematically shown in FIG. 8. As shown in FIG. 8, the protection circuit 104 is configured including a single NMOS transistor 110, with the drain terminal of the NMOS transistor 110, serving as the first terminal 104A, connected to the power source line VDD, the source terminal the gate terminal, back gate terminal and source terminal of the NMOS transistor 110, serving as the second terminal 104B, connected to the ground line GND. The protection circuit 104 configured as described uses the breakdown characteristics of the NMOS transistor 110 to release charge caused by the surge voltage. Accordingly, for example, when a salicide structure transistor and high withstand voltage transistor, Silicon-On-Insulator (SOI) transistor, Silicon-On-Sapphire (SOS) transistor, or the like is employed as the NMOS transistor 110 in order to achieve an increase in speed, damage soon occurs when the NMOS transistor 110 is in breakdown operation.

There are known techniques, such as those described in Japanese Patent Application Laid-Open (JP-A) No. 2006-121007 and in JP-A No. 7-7406, for employing as the incorporated protection circuit 104 in order to prevent damage due to breakdown operation of the NMOS transistor 110.

Figure 9:
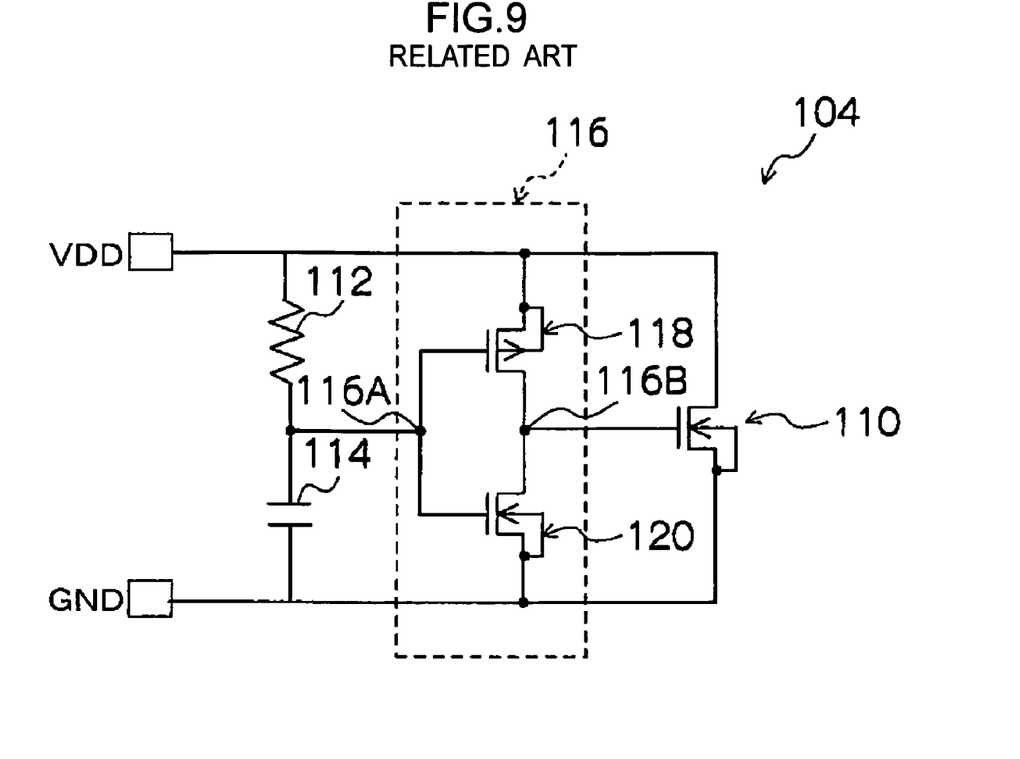
FIG. 9 is a circuit diagram showing an example of a conventional protection circuit.

FIG. 9 shows a schematic configuration of a protection circuit 104 applied in the techniques of JP-A No. 2006-121007 and JP-A No. 7-7406. As shown in FIG. 9, the protection circuit 104 is equipped with: a resistor 112 and a condenser 114, serving as a capacitive load, connected between the power source line VDD and the ground line GND; an inverter 116 having an input terminal 116A connected between the resistor 112 and the condenser 114; and an NMOS transistor 110 with gate terminal connected to the output terminal 116B of the inverter 116, drain terminal connected to the power source line VDD, and source terminal and back gate terminal connected respectively to the ground line GND.

The inverter 116 is a CMOS inverter configured by complementarily disposed PMOS transistor 118 and NMOS transistor 120. Namely, the inverter 116 has the gate terminal of the PMOS transistor 118 and the gate terminal of the NMOS transistor 120 connected together, this connection point configuring the input terminal 116A, the drain terminal of the PMOS transistor 118 and the drain terminal of the NMOS transistor 120 connected together, this connection point configuring the output terminal 116B, the source terminal and the back gate terminal of the PMOS transistor 118 connected to the power source line VDD, and the source terminal and the back gate terminal of the NMOS transistor 120 connected to the ground line GND.

The protection circuit 104 configured as described can prevent damage due to breakdown of the NMOS transistor 110 by employing the frequency characteristics of an RC circuit configured by the resistor 112 and the condenser 114.

SUMMARY

A first aspect of the present invention is a protection circuit including a normally non-conducting protection circuit main body and a voltage application section. The protection circuit main body has a first terminal, a second terminal and a control terminal. In the protection circuit main body, a first voltage line is connected to the first terminal for applying a first voltage to a protected circuit, and a second voltage line is connected to the second terminal for applying a second voltage to the protected circuit. The protection circuit main body makes a state between the first terminal and the second terminal conductive when a magnitude of a voltage applied to the control terminal is a predetermined threshold value or greater. The voltage application section includes a wiring line with a first end connected to the first voltage line and a second end connected to the control terminal. When a first current having predetermined frequency characteristics flows from the first end in a particular flow path of the wiring line, the voltage application section applies a voltage of less than the threshold value to the control terminal due to generating an induced current so as to generated a magnetic field to cancel out a magnetic field occurring due to the first current, the induced current impeding flow of the first current. When a second current not having the frequency characteristics flows from the first end in the particular flow path, the voltage application section applies a voltage of the threshold value or greater to the control terminal. A second aspect of the present invention is a semiconductor device including the protection circuit of the first aspect and a semiconductor integrated circuit functioning as the protected circuit.

BRIEF DESCRIPTION OF THE DRAWINGS

Exemplary embodiments of the present invention will be described in detail based on the following figures, wherein.

DETAILED DESCRIPTION

Detailed explanation now flows regarding an example of an exemplary embodiment for implementing the present invention, with reference to the drawings. Note that explanation is given below of application of the present invention to a semiconductor device. Since the configuration of the semiconductor device according to the present exemplary embodiment is similar to the configuration of the semiconductor device 100 shown in FIG. 7, except for the protection circuit 104, the same reference numerals are allocated to similar components and further explanation is omitted.

First Exemplary Embodiment

Figure 1:
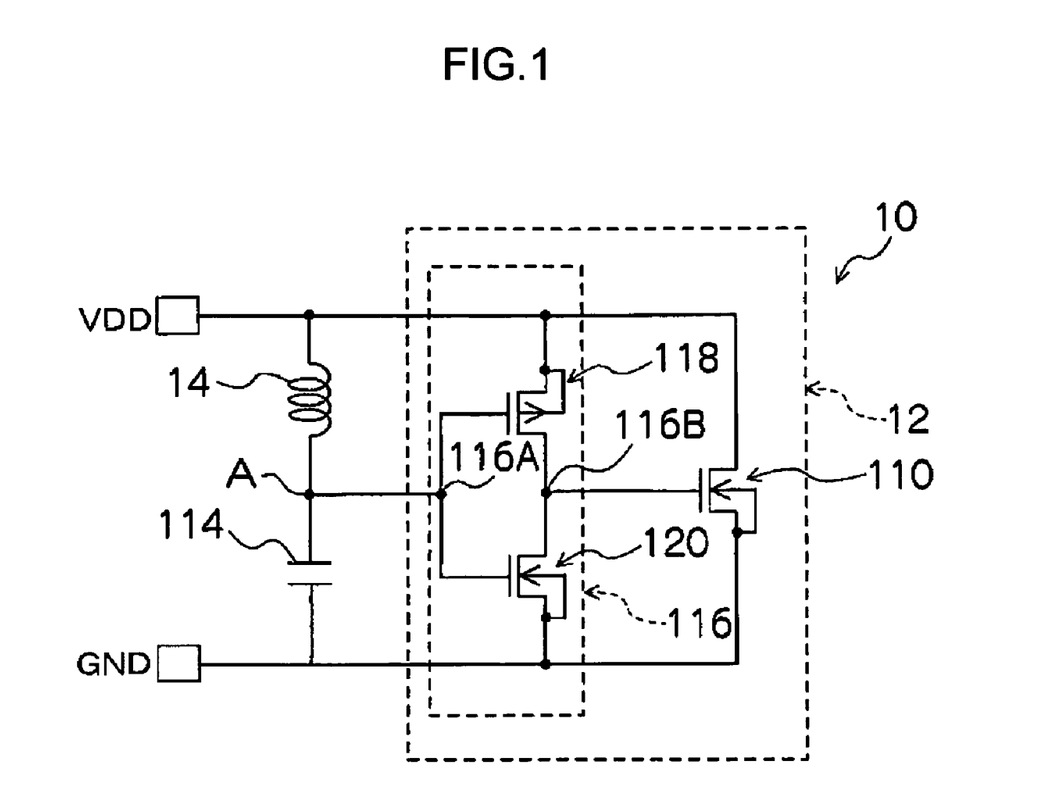
FIG. 1 is a circuit diagram showing an example of a protection circuit according to a first exemplary embodiment.

FIG. 1 is a circuit diagram showing an example of a configuration of a protection circuit 10 according to the first exemplary embodiment. Note that the semiconductor device according to the first exemplary embodiment only differs from the semiconductor device 100 shown in FIG. 7 in that the protection circuit 10 is applied in place of the protection circuit 104.

As shown in FIG. 1, the protection circuit 10 is configured including: a protection circuit main body 12 configured including an inverter 116 and an NMOS transistor 110; a current regulating section 14 serving as a voltage application section; and a condenser 114. The protection circuit 10 differs from the protection circuit 104 shown in FIG. 7 only in that the current regulating section 14 is applied in place of the resistor 112.

Figure 2:
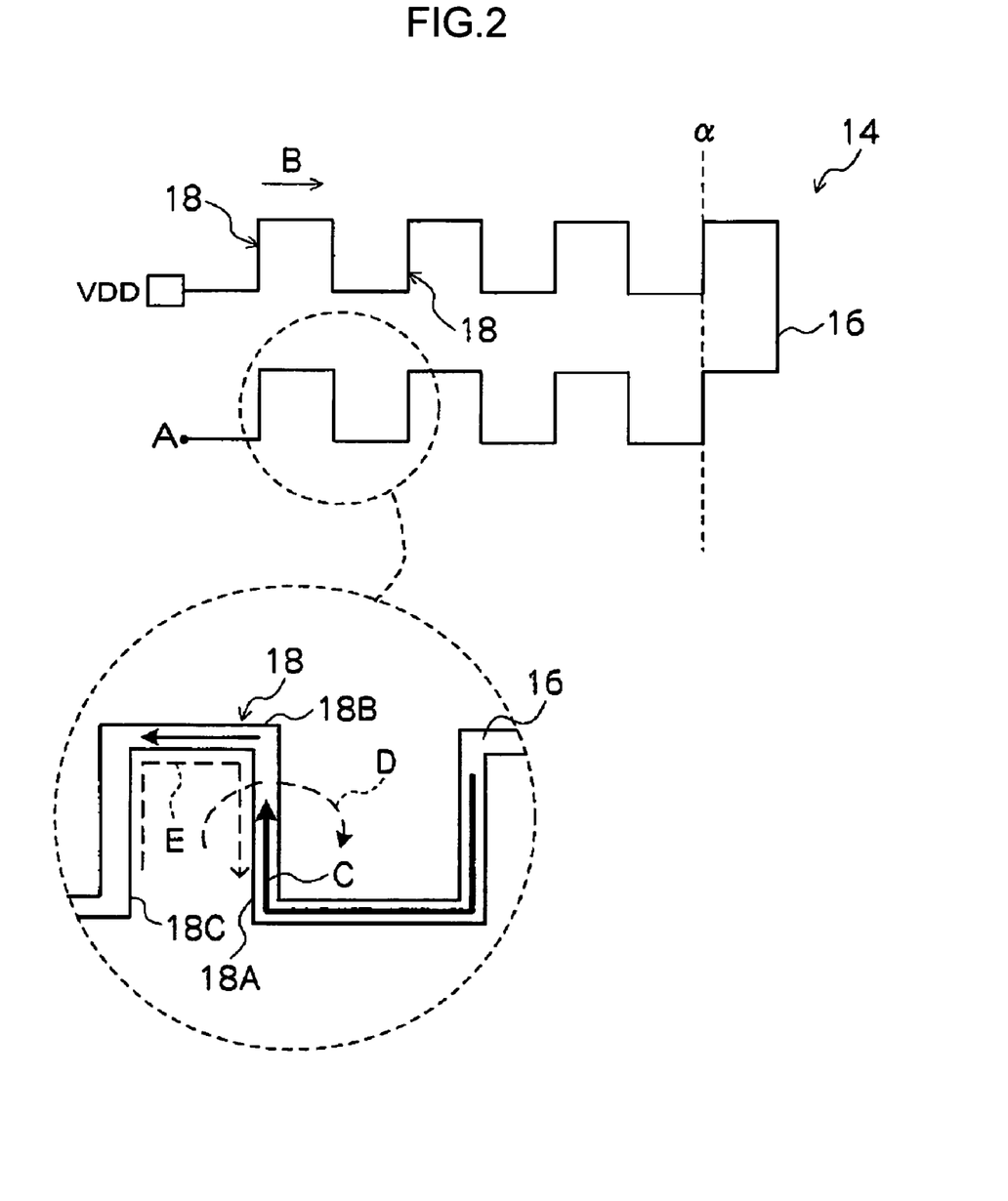
FIG. 2 is a configuration diagram showing an example of a configuration of a current regulating section according to the first exemplary embodiment.

FIG. 2 is a configuration diagram showing an example of a configuration of the current regulating section 14 according to the first exemplary embodiment.

As shown in FIG. 2, the current regulating section 14 is configured with a wiring line 16 formed from an electrical conductor (for example, from copper), and is formed in a single type of wiring layer in the semiconductor device according to the first exemplary embodiment. A first end of the wiring line 16 is connected to a power source line VDD, and the second end of the wiring line 16 is connected to a connection point (node) A of an input terminal 116A and the condenser 114. In the current regulating section 14, from the first end of the wiring line 16 up to a predetermined position α, bent sections 18 of substantially rectangular U-shape are formed connected to each other by the wiring line 16 bending around at an angle of substantially 90° (with a tolerance of ±1°), the bent sections 18 are formed at a given pitch along a direction (the arrow B direction in the first exemplary embodiment) intersecting the direct connection direction of the two ends of the wiring line 16 (for example, orthogonal thereto with a tolerance of ±1°). Also, the bent sections 18 of substantially rectangular U-shape are formed connected to each other by the wiring line 16 bending around at an angle of substantially 90° at the given pitch along the arrow B direction from the second end of the wiring line 16 up to the predetermined position α. This second set of plural bent sections 18 are formed in one-to-one adjacency to the bent sections 18 from the first end up to the predetermined position α, such that their shape, facing direction and size are also the same as the first set of the bent sections 18.

The bent sections 18 serve as current paths, and each are configured respectively by straight lines of a first current path 18A, a second current path 18B and a third current path 18C. The first current path 18A is disposed furthest upstream with respect to the current direction flowing from the power source line VDD, the third current path 18C is disposed furthest downstream with respect to the current direction flowing from the power source line VDD, and the second current path 18B connects the out end of the first current path 18A to the in end of the third current path 18C. More specifically, each of the second current paths 18B is disposed running along the arrow B direction, each of the first current paths 18A are disposed at substantially 90° to the second current paths 18B, and each of the third current paths 18C are disposed facing and substantially parallel to the first current paths 18A and at substantially 90° to the second current paths 18B.

In the current regulating section 14, when a portion of current, flowing in the power source line VDD due to, for example, surge voltage applied to the power source line VDD (referred to below as surge current), flows as current C into the first end of the wiring line 16, the current C flows in the first current path 18A of the bent section 18 and generates a magnetic field D. At this time a physical phenomenon occurs in which an induced current is generated in the third current path 18C such that an induced current E flows to generate a magnetic field to cancel out the magnetic field D.

The plural bent sections 18 utilize this physical phenomenon with a configuration such that when a current flows in from the first end of the wiring line 16 having a rate of rise that exceeds the rate of rise of current that would flow due to the voltage applied to the power source line VDD on starting driving of a protected circuit 102, this high rate of rise current does not flow out further than the second end of the wiring line 16. However, when a current, having a rate of rise than the rate of rise of current that would flow due to application of voltage to the power source line VDD or slower, flows in from the first end of the wiring line 16, this current flows out further from the second end of the wiring line 16 so as to provide a voltage of the minimum voltage or higher for: applying to the gate terminal of the PMOS transistor 118 to transition the state between the source terminal and the drain terminal of the PMOS transistor 118 from a conducting state to a non-conductive state (switching the PMOS transistor 118 as a switch element from the on state to the off state); and for applying to the gate terminal of the NMOS transistor 120 to transition the state between the source terminal and the drain terminal of a NMOS transistor 120 from a non-conductive state to a conducting state (switching the NMOS transistor 120 as a switch element from an off state to an on state).

Namely, when current flows in to the first end of the wiring line 16 from the power source line VDD having a rate of rise that exceeds a predetermined rate of rise (for example, a surge current due to being subjected to ESD), the plural bent sections 18 gradually attenuate the magnitude of this current by induced current generated in the first to the third first current paths 18A to 18C of the current paths 18, and this current does not flow further out from the second end of the wiring line 16. However, when a current flows in from the first end of the wiring line 16 having a rate of rise, or a slower, than the rate of rise of a current flowing due to voltage being applied to the power source line VDD, even though the magnitude of this current is gradually attenuated due to induced current generated in the first to the third first current paths 18A to 18C of the bent sections 18, a current still flows out from the second end of the wiring line 16 such that a voltage is applied capable of switching the PMOS transistor 118 and the NMOS transistor 120 as switch elements between their on states and their off states.

The plural bent sections 18 according to the first exemplary embodiment are configured such that induced current is generated in the second current paths 18B, of the bent sections 18 configuring the row of bent sections 18 from the second end of the wiring line 16 up to the predetermined position α, for generating a magnetic field to cancel out the magnetic field occurring due to current flowing towards the second end of the wiring line 16 in the corresponding second current path 18B, of the bent sections 18 formed in the row up of bent sections 18 from the first end of the wiring line 16 up to the predetermined position α.

In the first exemplary embodiment, mention above of "current . . . having a rate of rise that exceeds the rate of rise of current that would flow due to the voltage applied to the power source line VDD" envisages that, in contrast to taking 100 ms for transitioning the protected circuit 102 from a voltage value of 0 (V) to voltage value β (V) for stable driving of the protected circuit 102, a surge current takes a duration of only 10 ns for transitioning from a voltage value of 0 (V) to β (V). However, this is only an example and configuration may be determined in consideration of the relationship between the rate of rise of surge current due to conceivable ESD and the rate of rise of current flowing in the power source line VDD when applying driving voltage to the protected circuit 102.

In the first exemplary embodiment, the time constant due to the current regulating section 14 and the condenser 114 is from 300 ns to 400 ns, however the time constant of the current regulating section 14 and the condenser 114 may be determined according to conceivable cutoff current and the duration for making a conducting state between the source terminal and the drain terminal of the NMOS transistor 110. For example, a static electricity damage withstand evaluation method, such as a Human Body Model (HBM), Machine Model (MM), Charged Device Model (CDM), or the like, may be employed, and the time constant determined such that by application of a surge voltage from ESD to the semiconductor device, a specific potential difference occurs between the electrical potential at the source terminal of the PMOS transistor 118 of the inverter 116 and the electrical potential at the gate terminal of the PMOS transistor 118.

Note that when no discrimination is made below between the minimum voltage required to be applied to the gate terminal of the PMOS transistor for switching (as a switch element between an on state and an off state) by transitioning the state between the source terminal and the drain terminal of the PMOS transistor from a conducting state to a non-conductive state, and the minimum voltage required to be applied to the gate terminal of the NMOS transistor for switching (as a switch element between an off state and an on state) by transitioning the state between the source terminal and the drain terminal of the NMOS transistor from a non-conductive state to a conducting state, then these voltages are collectively referred to as "threshold value voltage".

Explanation now follows regarding operation of the semiconductor device according to the first exemplary embodiment.

To avoid confusion, explanation follows for each of the following cases: a plus surge voltage caused by being subjected to ESD is applied in a state in which there is no potential difference between the power source line VDD and a ground line GND (for example, a state in which both the power source line VDD and the ground line GND are at ground electrical potential) (referred to below as a "standby state"); a driving voltage for driving the protected circuit 102 is applied to the power source line VDD in the standby state; and a minus surge voltage caused by being subjected to ESD is applied to the ground line GND in the standby state.

Explanation first follows regarding and example in which a plus surge voltage is applied to the power source line VDD.

When a plus surge voltage is applied to the power source line VDD in the standby state and a surge current flows, a portion of this surge current flows in to the bent section 18 from the first end of the current regulating section 14. Accordingly, induced electromotive force is generated in the bent section 18 and an induced current flows so as to impede the flow of the surge current. The magnitude of the surge current that has flowed in at the current regulating section 14 is gradually attenuated by induced electromotive force generated in each of the plural bent sections 18 formed connected together from the first end of the current regulating section 14 to the second end of the current regulating section 14, preventing current flowing out further than the connection point A to the input terminal 116A of the inverter 116. Consequently, a voltage of the threshold value voltage or higher is not applied to the gate terminals of each of the PMOS transistor 118 and the NMOS transistor 120, and the conducting state between the source terminal and the drain terminal of the PMOS transistor 118, and the non-conductive state between the source terminal and the drain terminal of the NMOS transistor 120, are maintained. As a result, due to application to the gate terminal of the NMOS transistor 110 of voltage arising from the surge current from the power source line VDD flowing in at the inverter 116 through the source terminal of the PMOS transistor 118, the non-conductive state between the source terminal and the drain terminal of the NMOS transistor 110 transitions to the conducting state, and the surge current flowing to the power source line VDD flows out from the power source line VDD to the ground line GND through the drain terminal and the source terminal of the NMOS transistor 110.

However, when a driving voltage for driving the protected circuit 102 is applied to the power source line VDD in the standby state, a portion of the driving current flowing to the power source line VDD due to application of the driving voltage flows in to the bent sections 18 from the first end of the current regulating section 14. Accordingly, induced electromotive force is generated in the bent sections 18, and induced current flows impeding the driving current. The magnitude of the driving current flowing in the current regulating section 14 is gradually attenuated due to the induced electromotive force from each of the plural bent sections 18 formed connected alternately and continuously between the first end and the second end of the current regulating section 14, however the driving current flows to the inverter 116 through the connection point A and the input terminal 116A. Consequently, since a voltage of the threshold value voltage or greater is applied to each of the gate terminals of the PMOS transistor 118 and the NMOS transistor 120, the conducting state between the source terminal and the drain terminal of the PMOS transistor 118 transitions to the non-conductive state, and the non-conductive state between the source terminal and the drain terminal of the NMOS transistor 120 transitions to the conducting state. As a result, since a voltage of the threshold value voltage or greater is applied to the gate terminal of the NMOS transistor 110, the non-conductive state between the source terminal and the drain terminal of the NMOS transistor 110 is maintained, and current can be prevented from flowing out from the power source line VDD to the ground line GND through the drain terminal and the source terminal of the NMOS transistor 110.

Explanation now follows regarding an example of application of a minus surge voltage to the ground line GND.

When a minus surge voltage is applied to the ground line GND in the standby state and a surge current flows, a portion of the surge current flows into the inverter 116 through the condenser 114, the connection point A, and the input terminal 116A. Accordingly, due to a voltage of the threshold value voltage or greater being applied to the gate terminals of each of the PMOS transistor 118 and the NMOS transistor 120, the PMOS transistor 118 transitions from the conducting state to the non-conductive state, and the non-conductive state between the source terminal and the drain terminal of the NMOS transistor 120 transitions to the conducting state. As a result, voltage due to surge current that has flowed in at the inverter 116 from the ground line GND through the source terminal of the NMOS transistor 120, is applied to the gate terminal of the NMOS transistor 110. Consequently, the non-conductive state between the source terminal and the drain terminal of the NMOS transistor 110 transitions to the conducting state, and the surge current flowing to the ground line GND, flows from the ground line GND through the source terminal and drain terminal of the NMOS transistor 110 out to the power source line VDD.

As explained in detail above, according to the semiconductor device according to the first exemplary embodiment, when a surge current, serving as a first current having predetermined frequency characteristics, flows from the power source line VDD into the current regulating section 14, induced electromotive force is generated so as to generated a magnetic field that cancels out the magnetic field occurring due to the surge current, thereby impeding flow of the surge current, and hence applying a voltage of less than the threshold value to the gate terminal of the NMOS transistor 110. However, when a driving current, serving as a second current not having the predetermined frequency characteristics flows from the power source line VDD into the current regulating section 14, due to a voltage of the threshold value voltage or greater being applied to the gate terminal of the NMOS transistor 110, a surge current flowing to the power source line VDD flows to the ground line GND through the drain terminal and the source terminal of the NMOS transistor 110. Consequently, since the driving current flowing to the power source line VDD is not allowed to flow to the ground line GND through the drain terminal and the source terminal of the NMOS transistor 110, incorrect operation of the protection circuit 10 can be suppressed from occurring.

Furthermore, according to the semiconductor device according to the first exemplary embodiment, due to the third current path 18C, serving as an induced electromotive force generation section, generating a magnetic field to cancel out the magnetic field occurring due to the surge current flowing in the first current path 18A, serving as a particular flow path, by generating the induced electromotive force to impede the flow of surge current, the magnitude of the surge current flowing in the first current path 18A is attenuated by the induced current, and incorrect operation of the protection circuit 10 can be suppressed from occurring easily and with high precision.

Furthermore, according to the semiconductor device of the first exemplary embodiment, the wiring line 16 is formed with bends, with plural of the bent sections 18 having the first to the third first current paths 18A to 18C formed between the first and the second ends of the current regulating section 14. The first to the third first current paths 18A to 18C respectively formed so as to face, and run substantially parallel, to each other such that the first to the third first current paths 18A to 18C function as induced electromotive force generating portions generating induced electromotive force for causing an induced current to flow so as to generated a magnetic field to cancel out the magnetic field occurring due to the surge current flowing from the first end to the second end in the facing flow path. Accordingly, the magnitude of the surge current flow is attenuated on progression from the first to the second end of the current regulating section 14, and consequently incorrect operation of the protection circuit 10 can be suppressed from occurring even easier and with higher precision.

Second Exemplary Embodiment

Figure 5:
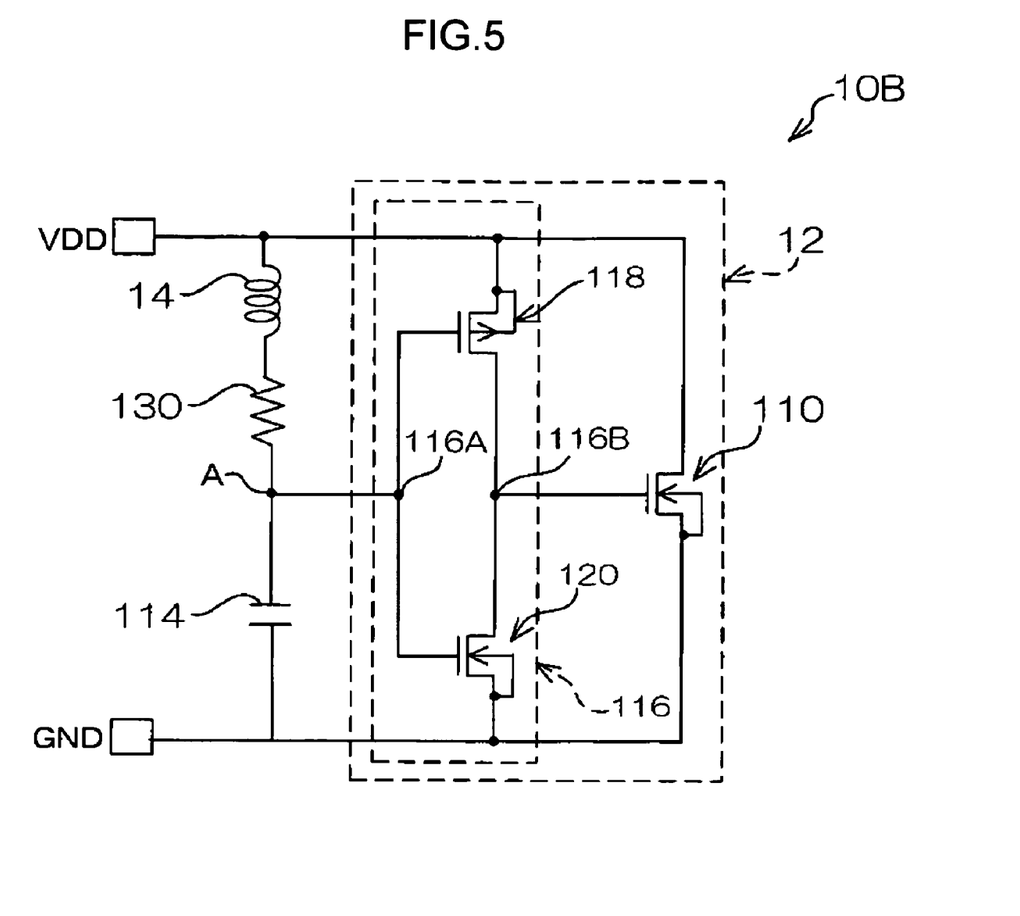
FIG. 5 is a circuit diagram showing an example of a configuration of a protection circuit according to a second exemplary embodiment.

FIG. 5 is a circuit diagram showing an example of a configuration of a protection circuit 10B according to the second exemplary embodiment. Note that in comparison to the protection circuit 10 shown in FIG. 1, the protection circuit 10B according to the second exemplary embodiment only differs in the respect that a resistor element 130 is additionally provided. Accordingly, only the points in second exemplary embodiment that differ from the first exemplary embodiment will be explained. In the second exemplary embodiment, the same reference numerals are appended to components similar to components explained in the first exemplary embodiment, and further explanation thereof is omitted.

The protection circuit 10 of the first exemplary embodiment is configured such that surge current is impeded from flowing by the current regulating section 14. This can be implemented when sufficient impedance required to impede inflow of the surge current to the protection circuit main body 12 is secured. However, in cases where impedance of an amount to prevent melt through of the wiring line 16 is not secured, there is a concern that the wiring line 16 might melt through, for example when current flows in from the power source line VDD to the current regulating section 14.

The protection circuit 10B according to the second exemplary embodiment has a resistance element 130 introduced, in the protection circuit 10 according to the first exemplary embodiment, between the power source line VDD and the connection point A and connected in series to the current regulating section 14. Specifically, a first end of the resistance element 130 is connected to the second end of the current regulating section 14, and the second end of the resistance element 130 is connected to the connection point A. Accordingly, the power source line VDD is connected to the connection point A through the serially connected current regulating section 14 and resistance element 130. [0060] Note that in the protection circuit 10B according to the second exemplary embodiment, a polycrystalline silicon resistor element having a higher resistance value that that of the current regulating section 14 is employed as the resistance element 130, however there is no limitation thereto, and a monocrystalline silicon resistor element may be employed. Preferably a resistance element with higher resistance value than that of the current regulating section 14 is employed as the resistance element 130 in this manner.

In the thus configured protection circuit 10B, since the power source line VDD and the connection point A are connected through the current regulating section 14 similarly to in the protection circuit 10 of the first exemplary embodiment explained above, similar operation and effect is naturally exhibited to that of the protection circuit 10 explained in the above first exemplary embodiment. However, for example, since impedance of the resistance element 130 acts in addition to the impedance of the current regulating section 14 when current has flowed in from the power source line VDD, conditions occurring in which the wiring line 16 of the current regulating section 14 melts through can be further suppressed in comparison to when the power source line VDD and the connection point A are only connected together through the current regulating section 14. For example, by replacing a front half portion or a later half portion of the wiring line 16 configuring the current regulating section 14 with a resistance element corresponding to the resistance element 130, a greater reduction in surface area of the protection circuit overall can be expected than when securing such impedance by the current regulating section 14 alone, as shown in FIG. 10.

Note that in the protection circuit 10 according to the above first exemplary embodiment, since the power source line VDD and the connection point A are connected together only through the current regulating section 14, the response time to surge current is determined by the impedance of the current regulating section 14. However, in the protection circuit 10B according to the second exemplary embodiment, the power source line VDD and the connection point A are connected together through the serially connected current regulating section 14 and resistance element 130, hence the response time to surge current is determined by the serial impedance of the impedance of the current regulating section 14 and the impedance of the resistance element 130. Hence, in the protection circuit 10B according to the second exemplary embodiment, a resistance element is employed as the resistance element 130 to secure the required impedance such that the wiring line 16 of the current regulating section 14 does not melt through, and to obtain an appropriate response time to surge current.

Note that while in the second exemplary embodiment there is a single resistance element 130 connected in series to the current regulating section 14, a resistance element unit, configured with plural resistance elements 130 connected in series, may be connected in series to the current regulating section 14.

Furthermore, while a fixed resistance element is employed as the resistance element 130 in the second exemplary embodiment, there is no limitation thereto, and a semi-fixed resistance element or a variable resistance element may be applied. A resistance element unit, configured from two or more of any such resistance elements connected in series, may be connected in series to the current regulating section 14.

Furthermore, while explanation has been given in the second exemplary embodiment of a case in which the first end of the resistance element 130 is connected to the second end of the current regulating section 14, and the second end of the resistance element 130 is connected to the connection point A, there is no limitation thereto. For example, the first end of the resistance element 130 may be connected to the power source line VDD and the second end of the resistance element 130 connected to the first end of the current regulating section 14. The resistance element 130 or a resistance element unit may also be connected in series to the current regulating section 14 at each of the first and the second end sides of the current regulating section 14.

Third Exemplary Embodiment

Figure 6:
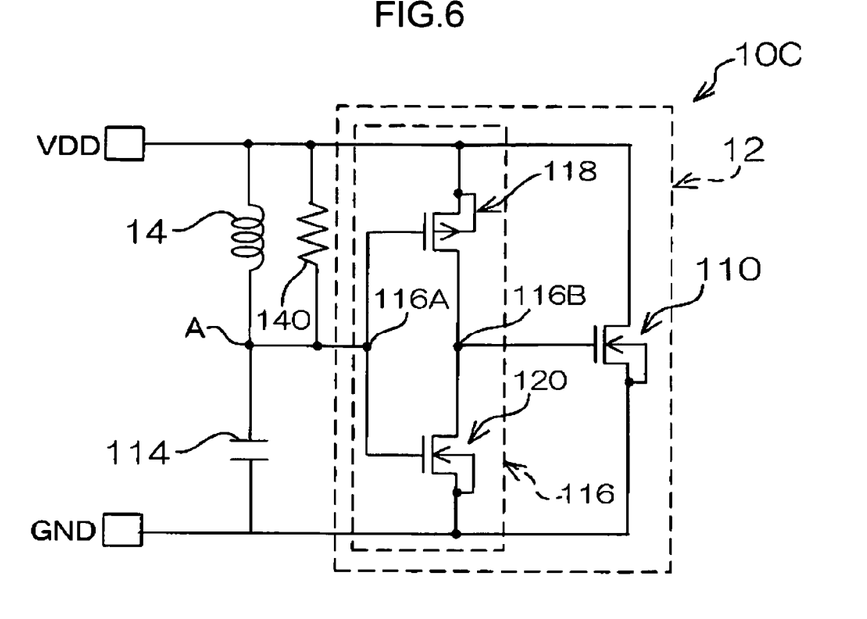
FIG. 6 is a circuit diagram showing an example of a configuration of a protection circuit according to a third exemplary embodiment.

Explanation follows, with reference to FIG. 6, regarding a third exemplary embodiment configured as an exemplary embodiment for preventing melting through of the wiring line 16 with a different configuration from the above second exemplary embodiment. Note that FIG. 6 is a circuit diagram showing an example of a configuration of a protection circuit 10C according to the third exemplary embodiment. The protection circuit 10C according to the third exemplary embodiment only differs in comparison to the protection circuit 10 shown in FIG. 1 in the additional provision of the resistance element 140. Only the points in the third exemplary embodiment that differ from the above first exemplary embodiment will be explained. Components in the third exemplary embodiment similar to components explained in the first exemplary embodiment are allocated the same reference numerals and further explanation thereof is omitted.

In the protection circuit 10C according to the third exemplary embodiment, the resistance element 140 is introduced between the power source line VDD and the input terminal 116A, connected in parallel to the current regulating section 14. Specifically, a first end of the resistance element 140 is connected to the power source line VDD, and a second end of the resistance element 140 is connected to the input terminal 116A. Accordingly, the power source line VDD is connected to the input terminal 116A through the parallel connected current regulating section 14 and resistance element 140. Note that while the protection circuit 10C in the third exemplary embodiment employs a polysilicon resistance element with higher resistance value than the current regulating section 14 as the resistance element 140, there is no limitation thereto, and a monocrystalline silicon resistor element may be employed. Preferably a resistance element is employed having a higher resistance value than that of the current regulating section 14 in this manner.

In the thus configured protection circuit 10C, since the power source line VDD and the input terminal 116A are connected together through the current regulating section 14 similarly to in the protection circuit 10 explained in the first exemplary embodiment above, similar operation and effects are naturally exhibited to those of the protection circuit 10 explained in the first exemplary embodiment. However, for example, since the impedance of the resistance element 140 acts in addition to the impedance of the current regulating section 14 when current flows in from the power source line VDD, conditions in which the wiring line 16 of the current regulating section 14 melts through can be better suppressed from occurring in comparison to a case in which the power source line VDD and the input terminal 116A are connected together through the current regulating section 14 alone. Furthermore, during the period in which current restricted from flowing to the protection circuit main body 12, due to the impedance to surge current of the current regulating section 14 and the impedance of the resistance element 140, is charging up the condenser 114, the electrical potential of the input terminal 116A changes more smoothly than the electrical potential change of the surge current, and so the protection circuit 10C can be made to operate more closely to as expected than cases in which the resistance element 140 is not provided.

Note that in the protection circuit 10 according to the first exemplary embodiment, since the power source line VDD and the input terminal 116A are connected together through the current regulating section 14 alone, the response time to surge current is determined by the impedance of the current regulating section 14, however, since in the protection circuit 10C according to the third exemplary embodiment, the power source line VDD and the input terminal 116A are connected together through the current regulating section 14 and through the resistance element 140 that is connected so as to be in parallel to the current regulating section 14, the response time to surge current is determined by the parallel impedance of the impedance of the current regulating section 14 and the impedance of the resistance element 140. Consequently, in the protection circuit 10C according to the third exemplary embodiment, a resistance element is employed as the resistance element 140 for securing the impedance required such that the wiring line 16 of the current regulating section 14 does not melt through, and to obtain an appropriate response time to surge current.

Note that while in the third exemplary embodiment a single resistance element 140 is connected in parallel to the current regulating section 14, a parallel resistance element unit configured with plural resistance elements 140 connected together in parallel may be connected to the current regulating section 14 in parallel. Furthermore, a serial resistance element unit, configured with plural resistance elements 140 connected together in series, may be connected to the current regulating section 14 in parallel. Furthermore, one or more of the resistance elements 130 described in the second exemplary embodiment may be connected in series to the current regulating section 14, together with one or more of the resistance element 140, the above parallel resistance element unit, and/or the above serial resistance element unit connected to the current regulating section 14 in parallel.

While a fixed resistance element is employed as the resistance element 140 in the third exemplary embodiment, there is no limitation thereto, and a semi-fixed resistance element or a variable resistance element may be applied. A parallel resistance element unit, configured from two or more of any such resistance elements connected in parallel, may be connected in series to the current regulating section 14.

Figure 3:
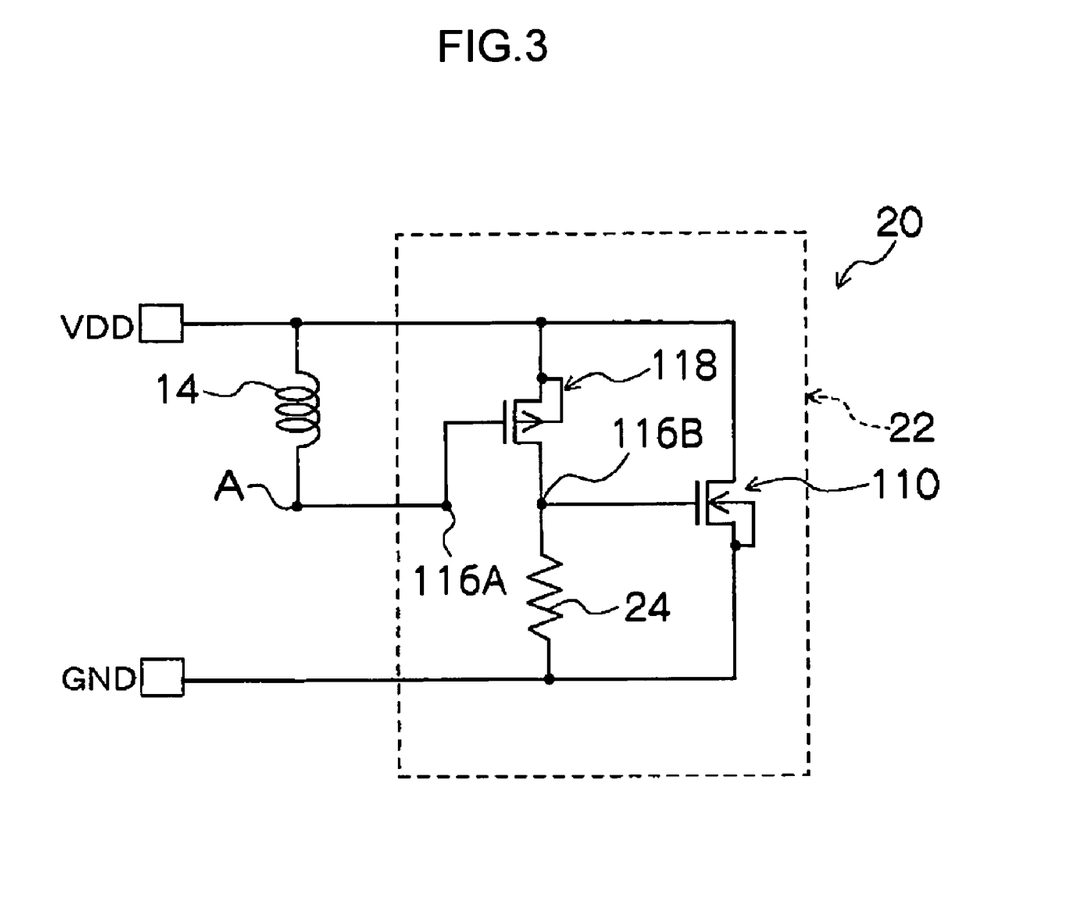
FIG. 3 is a circuit diagram showing a modified example of a protection circuit according to the first exemplary embodiment.

Note that while in each of the exemplary embodiments above explanation has been given of a protection circuit 10, 10B, 10C, equipped with a condenser 114 and a NMOS transistor 120, installed in a semiconductor device, there is no limitation thereto, and, for example, a protection circuit 20 shown in FIG. 3 may be installed to a semiconductor device.

The protection circuit 20 shown in FIG. 3 only differs in comparison to the protection circuit 10 shown in FIG. 1 in the respect that the condenser 114 has been removed, and in the respect that a protection circuit main body 22 is employed in place of the protection circuit main body 12. The protection circuit main body 22 only differs from the protection circuit main body 12 shown in FIG. 1 in that a resistor 24 is employed in place of the NMOS transistor 120.

Explanation now follows regarding operation of the protection circuit 20.

When a plus surge voltage is applied to the power source line VDD in the standby state and a surge current propagates, a portion of the surge current flows into the bent sections 18 from the first end of the current regulating section 14. The magnitude of the surge current that has flowed into the current regulating section 14 is gradually attenuated by the current regulating section 14, and prevented from flowing out past the connection point A to the gate terminal of the PMOS transistor 118. Accordingly, a voltage of the threshold value voltage or greater is no applied to the gate terminal of the PMOS transistor 118, and the conducting state is maintained between the source terminal and the drain terminal of the PMOS transistor 118. As a result, voltage, due to the surge current that has flowed from the power source line VDD to the inverter 116 through the source terminal of the PMOS transistor 118, is applied to the gate terminal of the NMOS transistor 110, the non-conductive state between the source terminal and the drain terminal of the NMOS transistor 110 transitions to the conducting state, and the surge current flowing to the power source line VDD flows from the voltage value through the drain terminal and the source terminal of the NMOS transistor 110 and out to the ground line GND.

However, when a driving voltage for driving the protected circuit 102 is applied to the power source line VDD in the standby state, a portion of the driving current flowing at the power source line VDD due to application of the driving voltage flows from the first end of the current regulating section 14 in to the bent sections 18. The magnitude of the current flowing at the current regulating section 14 is attenuated by the current regulating section 14, however a current flows to the PMOS transistor 118 through the connection point A and the input terminal 116A. Accordingly, since a voltage of the threshold value voltage or greater is applied to the gate terminal of the PMOS transistor 118, the conducting state between the source terminal and the drain terminal of the PMOS transistor 118 transitions to the non-conductive state. As a result, since a voltage of the threshold value voltage or greater is not applied to the gate terminal of the NMOS transistor 110, the non-conductive state between the source terminal and the drain terminal of the NMOS transistor 110 is maintained, and current from the power source line VDD can be prevented from flowing out to the ground line GND through the drain terminal and source terminal of the NMOS transistor 110.

However, when a minus surge voltage is applied to the ground line GND in the standby state and surge current flows, a portion of the surge current flows from the ground line GND into the resistor 24. Accordingly, since a voltage of the threshold value voltage or greater is applied to the gate terminal of the NMOS transistor 110, the non-conductive state between the source terminal and the drain terminal of the NMOS transistor 110 transitions to the conducting state, and the surge current flowing to the ground line GND flows from the ground line GND through the source terminal and drain terminal of the NMOS transistor 110 and out to the power source line VDD.

In each of the above exemplary embodiment, examples are given of cases in which the current regulating section 14 is configured such that current, having a rate of rise exceeding the rate of rise of current that would propagate due to voltage applied to the power source line VDD when starting to drive the protected circuit 102, does not flow from the first end of the wiring line 16 past the second end, there is no limitation thereto. For example, when current having a rate of rise exceeding the rate of rise of current that would propagate due to voltage applied to the power source line VDD when starting to drive the protected circuit 102 flows in from the first end of the wiring line 16, current may be permitted to flow out from the second end of the wiring line 16. However, in such cases, the current flowing out is limited to an amount that applies a voltage to the gate terminals of each of the PMOS transistor 118 and the NMOS transistor 120 insufficient to transition the conducting state between the source terminal and the drain terminal of the PMOS transistor 118 of the inverter 116 to the non-conductive state, and insufficient to transition the non-conductive state between the source terminal and the drain terminal of the NMOS transistor 120 to the conducting state.

Figure 4:
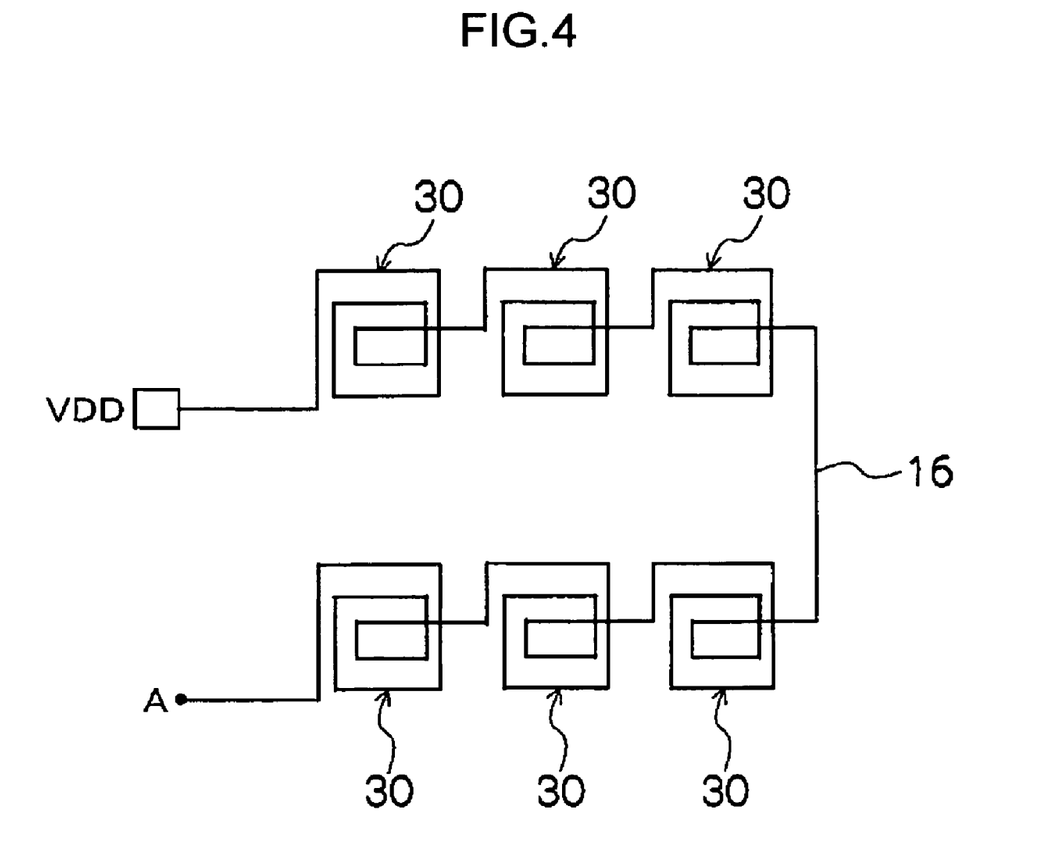
FIG. 4 is a configuration diagram showing a modified example of a current regulating section according to the first exemplary embodiment.

In each of the above exemplary embodiments, the wiring line 16 employed as the current regulating section 14 is a wiring line bent around and formed with the plural bent sections 18, however there is no limitation thereto. For example, the wiring line 16 formed with a single bent section 18 may be employed as the current regulating section 14. Furthermore, as in an example as shown in FIG. 4, plural inductors 30 formed such that respective portions of the wiring lines 16 are bent around in a spiral shape may be employed. A single inductor 30 may also be employed. Furthermore, a combination utilizing the bent section(s) 18 shown in FIG. 2 and the inductor(s) 30 shown in FIG. 4 may be employed as the current regulating section 14.

While explanation has been given in each of the exemplary embodiments above of examples in which field effect transistors are employed in the protection circuit 10, there is no limitation thereto, and bipolar transistors may be employed. In such cases, bipolar transistors may be incorporated into the protection circuit 10 in place of the field effect transistors such that the collect terminal of the bipolar transistor corresponds to the drain of the field effect transistor, the emitter terminal of the bipolar transistor corresponds to the source terminal of the field effect transistor, and the base terminal of the bipolar transistor corresponds to the gate terminal of the field effect transistors.

While explanation has been given in each of the exemplary embodiments above of examples in which the protection circuit 10 of the present exemplary embodiment is applied to a semiconductor device, the present invention is not limited thereto. For example, the protection circuit 10 may be applied to an electrical device other than a semiconductor device. An example of such a case is where a coil having similar functionality to the current regulating section 14 is applied instead of the current regulating section 14.

What is claimed is:

1. A protection circuit comprising a normally non-conducting protection circuit main body and a voltage application section, wherein:
the protection circuit main body comprises a first terminal, a second terminal and a control terminal;
in the protection circuit main body, a first voltage line is connected to the first terminal for applying a first voltage to a protected circuit, and a second voltage line is connected to the second terminal for applying a second voltage to the protected circuit;
the protection circuit main body makes a state between the first terminal and the second terminal conductive when a magnitude of a voltage applied to the control terminal is a predetermined threshold value or greater;
the voltage application section comprises a wiring line with a first end connected to the first voltage line and a second end connected to the control terminal;
when a first current having predetermined frequency characteristics flows from the first end in a particular flow path of the wiring line, the voltage application section applies a voltage of less than the threshold value to the control terminal due to generating an induced current so as to generated a magnetic field to cancel out a magnetic field occurring due to the first current, the induced current impeding flow of the first current;
when a second current not having the frequency characteristics flows from the first end in the particular flow path, the voltage application section applies a voltage of the threshold value or greater to the control terminal.

2. The protection circuit of claim 1, wherein:
the voltage application section comprises an induced electromotive force generation section; and
the induced electromotive force generation section is connected to the particular flow path, and is provided substantially parallel to the particular flow path, and an induced current flows in the induced electromotive force generation section to generate a magnetic field to cancel out the magnetic field occurring due to the first current flowing in the particular flow path, generating an induced electromotive force impeding flow of the first current.

3. The protection circuit of claim 2, wherein:
a plurality of the particular flow paths are provided between the first end and the second end;
each of the particular flow paths are formed by bending the wiring line, by making one of the particular flow paths that is facing and substantially parallel to each other function as the induced electromotive force generation section for generating induced electromotive force due to the first current in the other of the particular flow paths, such that the magnitude of the first current attenuates on progression from the first end towards the second end.

4. The protection circuit of claim 1, wherein:
the protection circuit main body comprises a first N-type field effect transistor and an inverter;
the first N-type field effect transistor comprises a drain terminal configuring the first terminal connected to the first voltage line, and a source terminal configuring the source terminal connected to the second voltage line;
the inverter comprises a P-type field effect transistor and a second N-type field effect transistor;
the source terminal of the P-type field effect transistor is connected to the first voltage line;
the source terminal of the second N-type field effect transistor is connected to the second voltage line;

the drain terminal of the P-type field effect transistor and the drain terminal of the second N-type field effect transistor are connected to the gate terminal of the first N-type field effect transistor; and a connection point where the gate terminal of the P-type field effect transistor is connected to the gate terminal of the second N-type field effect transistor configures the control terminal.

5. The protection circuit of claim 4 wherein the second end is connected to the second voltage line through a capacitive load.

6. The protection circuit of claim 1 wherein the first current is a current having a rate of rise exceeding the rate of rise of current that would flow due to application to the first voltage line of a driving voltage for the protected circuit.

7. The protection circuit of claim 1 wherein the voltage application section is a coil.

8. The protection circuit of claim 1 further comprising a resistance element introduced between the first voltage line and the control terminal, the resistance element being connected in series to the voltage application section.

9. The protection circuit of claim 1 further comprising a resistance element introduced between the first voltage line and the control terminal, the resistance element being connected in parallel to the voltage application section.

10. A semiconductor device comprising:
the protection circuit of claim 1; and
a semiconductor integrated circuit that functions as the protected circuit.

* * * * *